July 11, 1967 G. B. BOETTNER ET AL 3,330,639
GLASS MELTING FURNACE WITH BUBBLERS
Filed Dec. 23, 1963
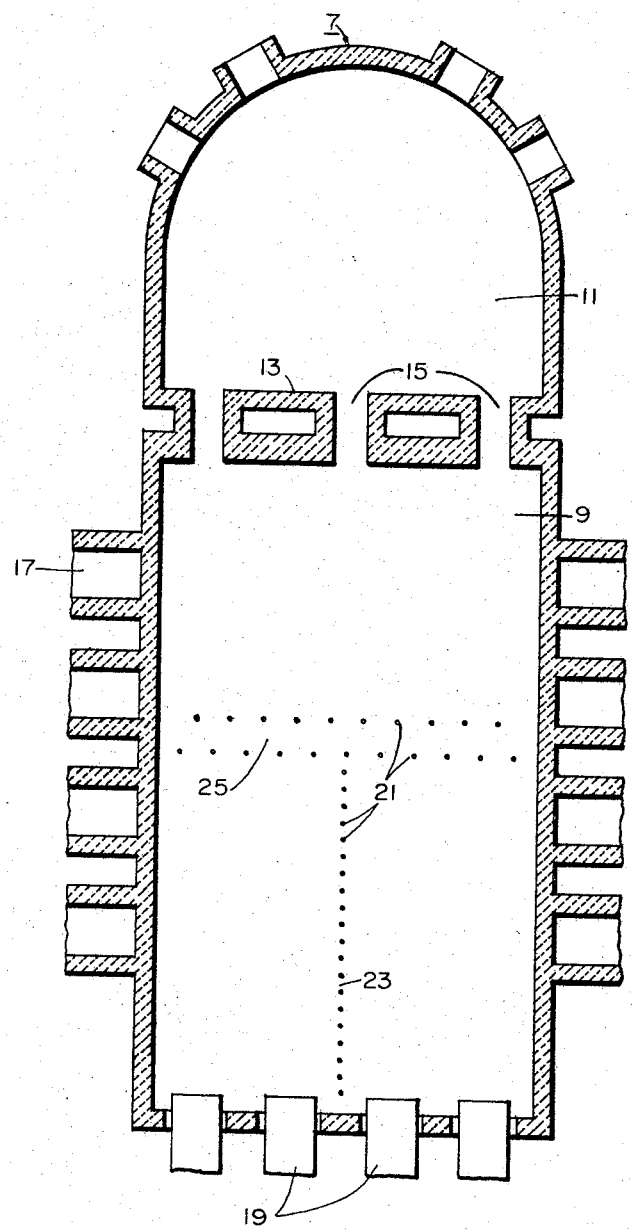
INVENTORS
George B. Boettner, Edward F. Fanning
BY
ATTORNEY

United States Patent Office 3,330,639
Patented July 11, 1967

3,330,639
GLASS MELTING FURNACE WITH BUBBLERS
George B. Boettner and Edward F. Fanning, Corning, N.Y., assignors to Corning Glass Works, Corning, N.Y., a corporation of New York
Filed Dec. 23, 1963, Ser. No. 332,674
5 Claims. (Cl. 65—179)

This invention relates to a new and improved method and apparatus for regulating convection currents in molten glass through the efficient utilization of bubblers in a glass tank. More particularly it relates to a pattern of bubblers, which in effect compartmentizes a rear portion of a furnace into two equal zones, to control the movement of raw batch materials and increase the melting rate and the glass quality in a continuous furnace.

Generally, raw batch material is continuously introduced by suitable means such as a plurality of screw or pushing mechanisms into the melting end of a tank or glass melting furnace. Heat is usually introduced by directing a flame across the surface of the glass material in the various zones of the tank, to melt the batch material and refine the molten glass. In such a melting operation, the molten glass body inevitably evidences some degree of convection currents, primarily between the hot glass surface and the inherently cooler bottom region. Such convection currents result from these temperature gradients occuring within the glass body, such as is common in all fluid masses.

Presently, on a majority of glass furnaces, the batch floats on the glass surface until melted. The configuration of "batch snakes" is produced by the floating batch and the batch snakes tend to migrate toward one side of the tank or the other. The surface region of the glass body with the least amount of batch tends to remain relatively hot, while the opposite surface region being supplied with most of the relatively cool batch material tends to become cold. Accordingly both the melting efficiency of the tank and glass quality are impaired.

Once batch distribution becomes nonsymmetrical, it tends to become even more disproportionate. Because the side of the furnace with the most raw batch is cooler, and surface movements are inherently from hot to cold, the cooler batch snakes move in that direction. Standard known methods for controlling unbalanced batch snakes have been to regulate furnace temperature distribution and to adjust the relative speed of the batch introducing mechanisms. However, these known methods have not been completely satisfactory since they are not responsive when the tank is extremely unbalanced, and there is an extensive time delay between a corrective adjustment and any resulting benefit produced thereby. Also an adjustment of these controls may detrimentally affect or influence other production factors of the tank. Accordingly, once flow has gone astray and the furnace has become out of balance, it must be allowed to remainin such an unbalanced condition with a resulting loss in melting efficiency.

Our invention not only alleviates the problem of unbalanced batch snakes heretofore encountered in glass furnaces, but also improves the quality of the glass produced. Basically our invention relates to an improved pattern of bubbling which provides a more efficient control of batch snakes than any previous method and apparatus used, by keeping the batch from going too far forward in the furnace and by keeping the batch evenly distributed form side to side in the furnace. We further create clear areas on the glass surface and thus allow more radiant energy to enter the glass body to promote melting efficiency and glass quality.

It thus has been an object of our invention to provide an improved pattern of bubbling to efficiently control batch snakes in a glass furnace.

A further object of our invention is to provide a method of controlling circulatory currents in a molten glass body to improve the quality of the glass produced.

A further object of our invention is to provide a method and apparatus to control circulatory currents in a molten glass body by providing a pattern of bubbling for keeping raw batch evenly distributed from side to side in the glass tank and for keeping the batch from going too far forward in the tank before it has been completely melted.

A further object of this invention is to provide a method and apparatus to compartmentize the rear portion of a glass furnace into two equal zones, to control the action of the raw batch materials and to increase the melting rate and glass quality in a glass furnace.

Other objects and advantages of the invention will be shown in the following detailed description of a preferred embodiment thereof as illustrated in the accompanying drawing which is a plan view of a glass tank showing a preferred pattern of bubbling units for practicing the present invention.

Referring now to the drawing of a plan view of a glass tank 7, consisting of a melting end 9, and a working or refining end 11, is shown separated by a bridge wall 13 containing a plurality of throats 15, although the invention is equally applicable to a single throat bridge wall.

The tank 7, may be of any known configuration having a conventional crown which is supported in the customary manner. Regenerator passages 17, lead to suitable regenerators of known construction wherein sensible heat of flue gases is utilized to preheat either or both air and fuel resulting in higher flame temperature to speed melting. The tank is constructed with the usual glass-compatible refractory materials.

Raw batch material can be charged into the melting end 9, of the furnace in several ways, such as screw-type filling machines. The raw materials of a desired glass composition enter through a plurality of schematically shown filling machines 19.

A plurality of bubblers 21 are positioned in the melter floor adjacent a rear portion of the melting end 9, and are interconnected below the glass tank to introduce a predetermined volume of a suitable gas, such as air, at a desired rate into the bath of molten glass. The introduced gas preferably forms a continuous series of separated gas volumes which rise to the surface of the molten glass body. The instant invention teaches a configuration of bubblers and the steps of introducing batch material in spaced-apart inlets into a zoned melting tank and not any explicit bubbler improvement.

The figure also shows a longitudinal, base leg or fence row bubbler group 23, arranged in a single line or plurality of closely annexed files parallel to a directed entrance of raw batch material from the filling machines 19, thus zoning the tank into longitudinally extending areas. Each such zone or region may be serviced by one or more of the filling machines. The volumes of gas emitted from the bubblers confine the introduced raw batch into the longitudinal area into which it was first introduced, thus preventing glass snakes from moving transversely across the tank, via convection currents in the molten glass body, into another longitudinal area.

Some distance into the tank and at a desired length of the single file of the longitudinal bubblers, a multiple row, bar or barrier bubbler group 25, is located transversely or laterally across the tank, perpendicularly to the base or leg bubbler group 23. The barrier bubbler group is preferably arrayed in a staggered or alternating arrangement, thus laterally separating out a rear portion of the tank and keeping the raw batch material from going too far forward in the furnace. Thus the bubblers have been arranged in a T pattern compartmentizing the introduced raw batch materials into two transversely positioned zones to control the movement of batch snakes in and on the molten glass body creating clear areas on the glass surface and allowing more radiant energy to enter the glass body thus increasing melting rate and glass quality.

The method of this invention is carried out by arranging bubblers in the melting end of the tank floor and continuously admitting raw batch material by means of a suitable mechanical feeding system. Volumes of gas are injected through the bubblers set in a longitudinal arrangement parallel to the direction of admittance of the raw batch material. Separating the raw batch material admitted on one side of the longitudinal bubbling arrangement from the raw batch material admitted on the other side of the lingitudinal bubbler arrangement are the line of volumes of gas rising to the surface of the molten glass body. In this way, the raw batch material is distributed in the various longitudinally-extending transverse zones at the melting end of the glass tank, rather than accumulating on one side or the other of the tank and hindering the melting process by thermally unbalancing the system. Lateral bubbling takes place at some distance into the tank and at a desired length of the leg of the fence row bubblers; lateral bubbling is accomplished by a barrier bubbler group which is perpendicularly located laterally across the tank, keeping the batch from going too far forward in the furnace, thus reducing the possibility of obtaining unmelted batch or stone in the refined glass. Exposing the raw batch more evenly to the sensible heat of the furnace reduces batch snakes due to convection currents and promotes a higher melting rate and increases the quality of the glass in a continuous melt furnace.

Thus, we have been able to provide an improved pattern of bubbling to effectively control batch snakes in a glass furnace, and to control the circulatory currents in a molten glass body to improve the quality of the glass produced. We have further compartmentized the rear portion of a glass furnace and evenly distributed the raw batch from side to side in the glass tank and kept the batch from going too far forward in the tank before it is completely melted, thus increasing the melting rate and glass quality in the glass furnace.

Although we have described our invention with respect to certain specific embodiments thereof, we do not wish to be thereby limited, as various modifications of our invention are intended to be encompassed within its true spirit and scope as indicated by the following claims.

We claim:

1. A glass melting furnace comprising end wall portions, side wall portions, and a bottom wall portion forming together a container for the melting of glass, a plurality of bubblers communicating with said container through said bottom wall portion and arranged in first and second rows, said first row of bubblers extending substantially across said furnace between said side wall portions and being spaced from said end wall portions, said second row of bubblers extending substantially from one said end wall portion to said first row of bubblers and being spaced from each said side wall portion to form two zones each defined by said second row of bubblers, a part of one of said side wall portions, a part of said first row of bubblers and a part of said one end wall portion, and means for supplying batch directly to each said zone at locations such that movement of unmelted batch from each said zone will be inhibited by the action of said bubblers.

2. A furnace according to claim 1 which includes means for supplying batch to each said zone of said furnace through said one end wall portion.

3. A furnace according to claim 1 which includes a melting end and a refining end separated by a bridge wall having at least one throat therein for the passage of glass between said ends, said bubblers being located within said melting end.

4. A furnace according to claim 3 in which said second row of bubblers extends substantially along the longitudinal center line of said furnace.

5. A furnace according to claim 4 which includes a third row of bubblers parallel to said first row and located between said first row and said bridge wall.

References Cited

UNITED STATES PATENTS

| | | | |
|---|---|---|---|
| 3,104,967 | 9/1963 | Beck et al. | 65—135 X |
| 3,268,320 | 8/1966 | Penberthy | 65—178 |

DONALL H. SYLVESTER, *Primary Examiner.*

A. D. KELLOGG, *Assistant Examiner.*